United States Patent [19]

Yamashita et al.

[11] 3,864,370

[45] Feb. 4, 1975

[54] METHOD OF REFINING CRUDE SYNTHETIC FATTY ACIDS

[75] Inventors: Takashi Yamashita; Sadayoshi Ninagawa, both of Kanagawa, Japan

[73] Assignee: Ajinomoto Co., Inc., Tokyo, Japan

[22] Filed: Aug. 2, 1972

[21] Appl. No.: 277,239

[30] Foreign Application Priority Data
Aug. 6, 1971   Japan................................ 46-59425

[52] U.S. Cl................................. 260/419, 260/540
[51] Int. Cl............................................... C09f 5/10
[58] Field of Search..................... 260/419, 540, 428

[56] References Cited
UNITED STATES PATENTS

| | | | |
|---|---|---|---|
| 2,171,202 | 8/1939 | Urbain et al........................ | 260/419 |
| 2,216,238 | 10/1940 | Harder................................ | 260/419 |
| 2,334,850 | 11/1943 | Traylor............................... | 260/419 |
| 2,586,947 | 2/1952 | Hays et al........................... | 260/419 |
| 3,052,701 | 9/1962 | Hampton............................ | 260/419 |

*Primary Examiner*—Lewis Gotts
*Assistant Examiner*—Ethel G. Love
*Attorney, Agent, or Firm*—Hans Berman; Kurt Kelman

[57] ABSTRACT

The crude fatty acid mixture produced by oxidation of paraffin is refined by heating to 150° to 350° C in the presence of a solid acid catalyst such as alumina, silica, titania, zirconia, a silica-alumina catalyst, or a molecular sieve to reduce the saponification value and ester value while increasing the iodine value.

4 Claims, No Drawings

METHOD OF REFINING CRUDE SYNTHETIC FATTY ACIDS

This invention relates to the purification of crude fatty acids, more particularly to the refining of the fatty acids produced by oxidation of paraffin.

It was common practice heretofore to saponify the crude fatty acids produced by oxidation of paraffin, to separate unsaponifiable matter from the soap solution so produced, and heating the solution at elevated pressure to temperatures of 320°C or more for 30 – 60 minutes. The estolides and esters present as contaminants are hydrolyzed thereby, and the alcohols, lactones, and hydroxyacids either present initially or formed by the saponification are dehydrated to olefins or unsaturated fatty acids. The acid that can be recovered from the saponification mixture is substantially improved.

However, the known process is relatively complex in that it requires the crude acids to be saponified and to be separated from unsaponifiable matter prior to refining. A significant amount of fatty acid is decarboxylated under the conditions required, and other side reactions also decrease the yield. Coloring matter is formed and present in the otherwise purified soap. The high viscosity of the soap solution in the heating zone makes processing difficult.

The object of the invention is the provision of a method of purifying or refining the crude fatty acids produced by oxidation of paraffin which is free of the shortcomings of the conventional method outlined above.

It has been found that the crude product can be refined successfully by heating the same in the presence of a solid acid catalyst. The acid is obtained in excellent quality and at high yield in a single step.

Decarboxylation and other side reactions impairing the yield are readily avoided.

The precise composition of the starting material is not of importance, and any crude fatty acid mixture prepared by paraffin oxidation, commonly referred to as "oxidate," is suitable while it still contains the unsaponifiable matter. However, the method of the invention is also used to advantage with crude fatty acids pretreated in any conventional manner, though not saponified.

The solid acid catalysts employed in the method of the reaction must be substantially inert to the pure fatty acids under the refining conditions, but need not satisfy other critical requirements. They should, however, be practically insoluble in fatty acids if convenient separation of catalyst and product is essential. Such catalysts include alumina, silica, titania, zirconia, mechanical and/or chemical mixtures of these oxides, such as silica-alumina catalysts, and molecular sieves.

The refining operation may be carried out batchwise or in continuous operation, and recovery of the catalyst does not require a separate step if a fixed bed catalyst is employed. Under other conditions, the catalyst is readily separated from the purified product by decanting or filtering. The catalysts employed have a long useful life, and may be restored to their full activity if necessary by burning off organic matter in an electric furnace by means of atmospheric oxygen or by washing the deactivated catalyst with ether or benzene.

The dwell time of the crude product in contact with the catalyst should be between 3 minutes and one hour, preferably 6 minutes to 30 minutes in continuous refining. In batch operation, the catalyst is employed in an amount of 0.1 to 50 percent, preferably 0.5 to 30 percent of the weight of the crude starting material.

The desired reaction occurs over a wide temperature range. Between 150° to 350°C it takes place without significant side-reactions. An even purer product is normally obtained by restricting the temperature to 160° to 310°C. The optimum temperature under any given set of conditions must be determined by experiment because it depends both on the nature of the raw material, on the nature of the catalyst, and on quantitative relationships. At temperatures higher than those indicated, decarboxylation is observed and the yield decreases with increasing temperature. At temperatures below the indicated range, complete purification cannot be achieved even if the processing time is greatly extended.

The known process described above requires pressures of 100 to 150 atmospheres. The method of this invention can be successfully carried out both at ambient pressure and at higher pressure. When the operation is performed in a closed vessel at elevated temperatures, the pressure of the vessel becomes between 6 and 150 atmospheres, normally between 10 and 100 atmospheres.

Water is formed during the refining process and forms an emulsion in the fatty acid at elevated pressure. The water is otherwise adsorbed by the catalyst and may impair the activity of the latter, particularly if the amount of catalyst available in the mixture is initially small. The decomposition of esters to fatty acids and olefins, and particularly the dehydration of alcohols, is reduced by the presence of excessive amounts of water, and there is not much improvement in the iodine value of the product. When the concentration of available water is held at the proper value, as by operation under pressure with the raw material or the catalyst, the hydrolysis of the esters, which is accelerated by water, and the decomposition of the esters, lactones, and alcohols which is hampered by water, can be performed satisfactorily at the same time. The refining operation proceeds smoothly when the raw material contains as much as 3 percent water by weight, but no benefits are derived from the added water. Under such conditions, the reaction mixture during the refining process contains at most 5 percent by weight.

When the operation is performed under atmospheric pressure, the water formed is not emulsified in the fatty acids. In the case that the water formed is returned to the reaction mixture by a condenser, the temperature of the mixture is not successfully elevated and the reaction does not fully proceed. Therefore, almost the water should be removed from the reaction mixture. The reaction is hindered at least to some extent by the water, but it is effective for avoiding the decarboxylation of the fatty acids. Therefore, the raw material which contains as much as 3 percent by weight is preferably employed. Good results are achieved even at relatively low temperature with catalysts of high activity. As such catalysts are much affected by the water, it is prefered to use the raw material of relatively low water content. Catalysts having only low activity require correspondingly higher refining temperature, at which water evaporates almost instantaneously and has little affinity for the catalyst, and therefore its presence does not affect the process.

The time required for carrying the reaction to its conclusion is affected by the nature of the catalyst, the reaction temperature and pressure, and the amount of water present. It may thus vary from as little as 1 - 2 minutes to as much as 1 - 2 hours, and other operating conditions may be chosen to achieve a desired reaction time.

The purified fatty acids may be recovered from the refining mixture in any conventional manner. The fatty acids may be isolated directly, but it is usually most convenient to saponify the refined fatty acids and to remove unsaponifiable matter by means of water-insoluble solvents, such as a mixture of benzene and ethanol. The pure acids are readily recovered from the soap by means of mineral acids, if so desired.

The following Examples further illustrate the invention.

EXAMPLE 1

125°F Paraffin was oxidized to yield a crude mixture A of fatty acids whose acid value (AV), saponification value (VS), ester value (EV), iodine value (IV), hydroxyl value (HV), and carbonyl value (CV) are listed in Table 1. The mixture was passed at a rate of 75 g per hour through an open tubular reactor kept at 270°C, having a diameter of 20 mm, and packed with a catalyst bed of 16 ml silica-alumina catalyst (13% $Al_2O_3$) having a grain size of 16 - 30 mesh. The characteristic parameters of the reaction product B so obtained are also listed in Table 1.

To recover the purified acids, the reaction product B was saponified with aqueous sodium hydroxide, and the unsaponifiable matter was separated from the soap solution by extraction with a benzene-ethanol mixture. The unsaponifiable matter C was recovered from the benzene layer by evaporation of the solvent, and the fatty acids D were floated from the soap solution with sulfuric acid and recovered.

For comparison purposes, the crude starting material was also saponified and fractionated into unsaponifiable matter E and free fatty acids F. The parameters for the unsaponifiable matter C and for the purified fatty acids D, and those of the original unsaponifiable matter E and the original acids F are included in Table 1.

EXAMPLE 2

125°F Paraffin was oxidized to yield crude synthetic fatty acids G. The crude mixture was held in contact with 16 ml silica having a grain size of 16 to 30 mesh in the afore-described reactor at 325°C and a flow rate of 75 g per hour. The product was worked up as in Example 1 to refined fatty acid H and unsaponifiable matter I.

For comparison purposes, the procedure was repeated with water being introduced into the reaction zone together with the crude fatty acid mixture G at a rate of 5 g per hour. Table 2 hereinbelow lists the parameters of the crude mixture G, the recovered acids H refined without water and of the corresponding unsaponifiables I, and of the acid J refined with water and of the corresponding unsaponifiable matter K.

Table 2

| Material | Yield,% | AV | SV | EV | IV | CV | HV |
|---|---|---|---|---|---|---|---|
| G | — | 64.0 | 106.2 | 42.2 | 1.9 | 19.1 | — |
| H | 33.4 | 197.4 | 227.2 | 29.8 | 7.4 | 9.5 | 3.3 |
| I | 65.4 | 0.4 | 4.4 | 4.0 | 5.4 | 18.0 | 37.8 |
| J | 31.8 | 198.9 | 221.9 | 23.0 | 2.2 | 8.2 | 3.2 |
| K | 68.3 | 0.6 | 1.8 | 1.2 | 10.7 | 21.6 | 14.8 |

EXAMPLE 3

A crude fatty acid mixture L was obtained by oxidation of paraffin. It was passed in the afore-described reactor at 80 g per hour and 290°C over 16 ml of packed γ-alumina having a grain size of 16 to 30 mesh. The parameters of the crude mixture L and those of the product M are listed in Table 3.

Table 3

| Material | AV | SV | EV | IV | CV | HV |
|---|---|---|---|---|---|---|
| L | 65 | 102 | 37 | 1.3 | 10.6 | 1.2 |
| M | 62 | 90 | 28 | 8.7 | 10.2 | — |

EXAMPLE 4

125°F Paraffin was oxidized to produce a crude fatty acid mixture N. 50 g Mixture N and 1.5 g silica-alumina catalyst (4.4% $Al_2O_3$) having a grain size of 100 to 300 mesh were charged into a flask of 200 ml capacity. The air in the flask was replaced by nitrogen. The reaction mixture was heated with stirring from room temperature to 250°C over a period of 35 minutes while the water formed distilled off. The reaction mixture was then cooled rapidly, and the catalyst settled. The reaction on product O had the properties listed in Table 4 together with those of crude mixture N and those of a product P obtained from the same material in an otherwise analogous run in which the reaction mixture was heated from room temperature to 220°C during 20 minutes, and was held at temperature for 2 hours.

Table 1

| Material | Yield,% | AV | SV | EV | IV | CV | HV |
|---|---|---|---|---|---|---|---|
| A | — | 64.7 | 115.5 | 50.8 | 0.6 | 7.4 | 1.6 |
| B | — | 63.7 | 77.1 | 13.4 | 20.1 | 9.6 | — |
| C | 67.2 | 0.3 | 1.0 | 0.7 | 22.9 | 3.5 | 2.8 |
| D | 32.3 | 216.2 | 230.0 | 13.8 | 17.0 | 5.7 | — |
| E | 65.0 | 0.4 | 0.5 | 0.1 | 1.3 | 2.8 | 4.4 |
| F | 34.1 | 188.6 | 222.6 | 36.0 | 2.4 | 6.1 | — |

Table 4

| Material | AV | SV | EV | IV |
|---|---|---|---|---|
| N | 62.5 | 106 | 43.5 | 1.5 |

Table 4-Continued

| Material | AV | SV | EV | IV |
|---|---|---|---|---|
| O | 53.6 | 61.5 | 7.9 | 16.1 |
| P | 56.6 | 76.3 | 19.7 | 18.1 |

EXAMPLE 5

125°F Paraffin was oxidized to produce crude synthetic fatty acids Q. 50 g Crude fatty acid mixture Q and 10 ml titania having a grain size of 100 to 300 mesh were charged into a flask of 200 ml capacity, and nitrogen was substituted for the air in the flask. The contents of the flask were heated with stirring from room temperature to 190°C over a period of 25 minutes while the formed water was distilled off. The product R then formed was held at 190°C with stirring and was sampled 30 minutes later (R') and 60 minutes later (R''). The parameters of the materials Q, R, R', and R'' are listed in Table 5.

Table 5

| Material | AV | SV | EV | IV |
|---|---|---|---|---|
| Q | 65.3 | 106.7 | 41.4 | 2.2 |
| R | 60.3 | 90.7 | 30.4 | 13.7 |
| R' | 60.6 | 83.2 | 22.6 | 16.3 |
| R'' | 59.9 | 80.1 | 20.2 | 16.8 |

EXAMPLE 6

125°F Paraffin was oxidized to a crude synthetic fatty acid mixture S of which 50 g was charged into the afore-mentioned flask together with 10 ml zirconia of grain size 100 to 300 mesh, whereupon the air in the flask was replaced with nitrogen. The temperature of the reaction mixture was raised from room temperature to 250°C within 35 minutes, causing water to distill off, whereupon stirring was continued at 250°C for 30 minutes. The properties of the product T so obtained and those of the starting material S are listed in Table 6.

Table 6

| Material | AV | SV | EV | IV |
|---|---|---|---|---|
| S | 62.5 | 106 | 43.5 | 1.5 |
| T | 58.3 | 84.1 | 25.8 | 13.0 |

EXAMPLE 7

125°F Paraffin was oxidized to a crude fatty acid mixture U. Zeolite 13X having a nominal molar composition of 0.8–1.0 Na$_2$O, 1 Al$_2$O$_3$, 2.8 SiO$_2$, nH$_2$O was treated with warm aqueous ammonium chloride solution until it was free from sodium ions. 50 g Fatty acids U and 10 ml of the treated molecular sieve catalyst were heated in a flask with stirring to 240°C over a period of 30 minutes, and the properties of the product V at this stage, after 30 minutes additional stirring at 240°C (V') and after 60 minutes stirring (V'') are listed in Table 7.

Table 7

| Material | AV | SV | EV | IV |
|---|---|---|---|---|
| U | 65.3 | 106.7 | 41.4 | 2.2 |
| V | 53.5 | 89.2 | 35.7 | 5.9 |
| V' | 49.7 | 82.7 | 33.0 | 9.5 |
| V'' | 49.1 | 80.1 | 31.0 | 10.9 |

The molecular sieve had been treated with warm ammonium chloride prior to the refining so as to remove sodium ions which may react with the fatty acids and to increase the acidic character.

EXAMPLE 8

50 g Crude fatty acid N as prepared in Example 4, 5 ml water, and 10 ml silica-alumina catalyst (4.4% Al$_2$O$_3$) having a grain size of 100 to 300 mesh were charged in a 100 ml autoclave. The mixture in the sealed autoclave was kept at 270°C for 30 minutes, and the product W so obtained was analyzed. The values obtained are listed in Table 8 together with those of a comparison product X obtained without catalyst.

In further comparison tests, the same reaction mixture was treated at 290°C for 10 minutes to produce products under the following modified conditions:

| | | | |
|---|---|---|---|
| Y | No water added, with catalyst | Y' | 1.0 ml water added, with catalyst |
| Z | No water added, no catalyst | Z' | 1.0 ml water added, no catalyst |

Table 8

| Material | AV | SV | EV | IV |
|---|---|---|---|---|
| W | 59.2 | 82.7 | 23.5 | 4.6 |
| X | 58.1 | 81.3 | 23.0 | 3.8 |
| Y | 62.7 | 81.7 | 19.0 | 16.9 |
| Y' | 64.4 | 82.3 | 17.9 | 15.5 |
| Z | 68.0 | 103.0 | 35.0 | 4.3 |
| Z' | 57.0 | 80.5 | 23.5 | 3.6 |

As is evident from lines W and X in Table 8, the presence of a large amount of water in the sealed system under high pressure prevents significant improvement in the iodine value, whereas a small amount has only a minor effect. Little, if anything, is achieved in the absence of the catalyst.

All catalysts of the invention are equally applicable at ambient pressure and at elevated pressure, and analogous results have been obtained in the closed, pressurized system of Example 8 with the catalysts referred to in the other Examples.

As is evident in part from the preceding Examples, heating of a crude fatty acid mixture obtained from the oxidation of paraffin according to this invention typically causes a decrease in the saponification value by at least 10 percent of the original value, and an increase in the iodine value by at least 7. Conditions have to be chosen for good results in such a manner that the amount of water in the reaction mixture during the refining process does not exceed 5 percent of the weight of the crude starting material.

While 125°F paraffin has been chosen in all Examples as the starting material for the oxidation step which precedes the method of this invention, this is not a necessary condition, and other commercial grades of normally solid or liquid paraffin produce results not significantly different from those specifically described.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed is:

1. A method of purifying crude fatty acid produced by oxidation of paraffin and essentially consisting of pure fatty acid and, as contaminants, ester of said fatty acid and at least one member of the group consisting of estolide, alcohol, lactone, and hydroxycarboxylic acid, which method comprises:
   a. holding a liquid phase essentially consisting of said crude fatty acid in contact with a solid catalyst at 150° to 350°C until the amount of said ester is substantially decreased, whereby said fatty acid is purified,
      1. said catalyst being insoluble in said crude fatty acid and inert to said pure fatty acid at said temperature,
      2. said catalyst essentially consisting of oxide of at least one member of the group consisting of aluminum, silicon, titanium, and zirconium; and
   b. separating the purified fatty acid from said catalyst.

2. A method as set forth in claim 1, wherein said crude fatty acids are heated to 160° to 310°C.

3. A method as set forth in claim 2, wherein said catalyst is a silica-alumina catalyst.

4. A method as set forth in claim 2, wherein said crude fatty acid is heated until the saponification value thereof is reduced and the iodine value thereof is increased.

* * * * *